(12) United States Patent
Uki (10) Patent No.: US 10,749,849 B2
(45) Date of Patent: Aug. 18, 2020

(54) DATA COMMUNICATION DEVICE, COMMUNICATION SYSTEM, DATA RELAY METHOD, AND RECORDING MEDIUM WITH STORED PROGRAM

(71) Applicant: NEC Corporation, Minato-ku, Tokyo (JP)

(72) Inventor: Raika Uki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 15/777,699

(22) PCT Filed: Dec. 6, 2016

(86) PCT No.: PCT/JP2016/005068
§ 371 (c)(1),
(2) Date: May 21, 2018

(87) PCT Pub. No.: WO2017/098722
PCT Pub. Date: Jun. 15, 2017

(65) Prior Publication Data
US 2018/0337900 A1 Nov. 22, 2018

(30) Foreign Application Priority Data
Dec. 7, 2015 (JP) .................. 2015-238426

(51) Int. Cl.
*H04L 29/06* (2006.01)
*H04L 29/08* (2006.01)
*H04L 9/36* (2006.01)

(52) U.S. Cl.
CPC ............ *H04L 63/0485* (2013.01); *H04L 9/36* (2013.01); *H04L 63/0428* (2013.01);
(Continued)

(58) Field of Classification Search
CPC ... H04L 63/0485; H04L 9/36; H04L 63/0428; H04L 63/0823; H04L 63/168; H04L 67/28
See application file for complete search history.

(56) References Cited

U.S. PATENT DOCUMENTS

2003/0226011 A1* 12/2003 Kuwano ................. G06F 21/10
713/155
2006/0031559 A1* 2/2006 Sorokopud ............. H04L 47/10
709/232
(Continued)

FOREIGN PATENT DOCUMENTS

JP 2006-332815 A 12/2006
JP 2011-205244 A 10/2011
(Continued)

OTHER PUBLICATIONS

International Search Report for PCT Application No. PCT/JP2016/005068, dated Mar. 7, 2017.
(Continued)

*Primary Examiner* — Tongoc Tran (57) ABSTRACT

A data communication device includes a first communicator that receives encrypted data; a second communicator that transmits the encrypted data; an identification information acquisition unit that, when the first communicator has received information for encryption that is used for establishing encrypted communications including encrypted part and plaintext part where the plaintext part includes identification information of a transmission source of the encrypted data, acquires the identification information from the information for encryption; and a configurator that sets data transmission of the second communicator, based on the identification information.

4 Claims, 4 Drawing Sheets

(52) U.S. Cl.
CPC ........ *H04L 63/0823* (2013.01); *H04L 63/168*
(2013.01); *H04L 67/28* (2013.01)

(56) References Cited

U.S. PATENT DOCUMENTS

| | | | |
|---|---|---|---|
| 2006/0236096 A1* | 10/2006 | Pelton | H04L 63/06 713/155 |
| 2007/0180510 A1 | 8/2007 | Long et al. | |
| 2007/0234414 A1* | 10/2007 | Liu | H04L 63/0218 726/11 |
| 2010/0138910 A1 | 6/2010 | Aldor et al. | |
| 2011/0238975 A1 | 9/2011 | Amemiya et al. | |
| 2014/0109225 A1 | 4/2014 | Holloway et al. | |
| 2015/0172064 A1 | 6/2015 | Takenaka et al. | |
| 2015/0244575 A1 | 8/2015 | Abe et al. | |

FOREIGN PATENT DOCUMENTS

| | | |
|---|---|---|
| JP | 2012-044694 A | 3/2012 |
| JP | 2015-115893 A | 6/2015 |
| JP | 2015-162717 A | 9/2015 |

OTHER PUBLICATIONS

English translation of Written opinion for PCT Application No. PCT/JP2016/005068.
Taiwanese Office Action for TW Application No. 105139599 dated Apr. 9, 2019 with English Translation.
Communication dated Aug. 28, 2018 from the European Patent Office in counterpart application No. 16872624.8.
Shbair et al., "Efficiently Bypassing SNI-based HTTPS Filtering", 2015 IFIP/IEEE International Symposium on Integrated Network Management (IM2015): Experience Session Paper, 2015. pp. 990-995.

* cited by examiner

DATA COMMUNICATION DEVICE, COMMUNICATION SYSTEM, DATA RELAY METHOD, AND RECORDING MEDIUM WITH STORED PROGRAM

This application is a National Stage Entry of PCT/JP2016/005068 filed on Dec. 6, 2016, which claims priority from Japanese Patent Application 2015-238426 filed on Dec. 7, 2015, the contents of all of which are incorporated herein by reference, in their entirety.

TECHNICAL FIELD

The disclosed subject matter relates to a data communication device, a communication system, a data relay method, and a recording medium with a program.

BACKGROUND ART

A relay device is often provided between a server device and a terminal device (a client device) to increase communication rates and safety. Communication data are often encrypted to further increase communication safety. With regard to a combination of such a relay device and encryption of communication data, several techniques have been suggested.

For example, in a communication method described in PTL 1, a secure sockets layer (SSL) proxy server, which relays communications between a web server and a terminal, issues a proxy certificate, based on a server certificate from the Web server and transmits the proxy certificate to the terminal.

In addition, a relay processing device described in PTL 2 performs an SSL handshake with an information processing device (a server device) to acquire a public key certificate of the information processing device from the information processing device before establishing an SSL communication with the information processing device. Then, the relay processing device transmits the public key certificate of the information processing device to a client terminal using a controlled communication at some point between starting the SSL handshake for establishing an SSL communication with the client terminal and actually establishing an SSL communication with the client terminal.

Further, in an encrypted communication system described in PTL 3, when transmitting a request for establishing an encrypted communication path to a server, a terminal transmits the request by specifying a relay device that is permitted to decrypt the request in the middle. The specified relay device establishes an encrypted communication path individually with an adjacent terminal, relay device, or server.

CITATION LIST

Patent Literature

PTL 1: JP 2015-115893 A
PTL 2: JP 2012-044694 A
PTL 3: JP 2006-332815 A

SUMMARY OF INVENTION

Technical Problem

A data communication device that relays data transmission may set data transmission according to the content of transmitting data. However, when transmitting data are encrypted, the data communication device cannot recognize the content of the data and, thus, may not appropriately set data transmission.

Whereas, PTL 1 to PTL 3 do not describe how a data communication device sets data transmission when transmitting data are encrypted and the data communication device cannot recognize the content of the data.

The disclosed subject matter aims to provide a data communication device, a communication system, a data relay method and a program that can solve the above problem.

Solution to Problem

According to a first aspect of the disclosed subject matter, a data communication device includes: a first communication means that receives encrypted data; a second communication means that transmits the encrypted data; an identification information acquisition means that, when the first communication means has received information for encryption that is used for establishing encrypted communications including encrypted part and plaintext part where the plaintext part includes identification information of a transmission source of the encrypted data, acquires the identification information from the information for encryption; and a setting means that sets data transmission of the second communication means, based on the identification information.

According to a second aspect of the disclosed subject matter, a communication system includes: a terminal device that requests data transmission; a data provision device that transmits encrypted data in response to a request from the terminal device; and a data communication device that relays communications between the data provision device and the terminal device. The data communication device includes a first communication means that receives the encrypted data that was transmitted from the data provision device and a second communication means that transmits the encrypted data to the terminal device. The data communication device includes: an identification information acquisition means that, when the first communication means has received information for encryption that is used for establishing encrypted communications including encrypted part and plaintext part where the plaintext part includes identification information of the data provision device, acquires the identification information from the information for encryption; and a setting means that sets data transmission of the second communication means, based on the identification information.

According to a third aspect of the disclosed subject matter, a data relay method includes; by the data communication device that includes a first communication means that receives encrypted data and a second communication means that transmits the encrypted data, when the first communication means has received information for encryption that is used for establishing encrypted communications including encrypted part and plaintext part where the plaintext part includes identification information of a transmission source of the encrypted data, acquiring the identification information from the information for encryption; and by the data communication device, setting data transmission of the second communication means, based on the identification information.

According to a fourth aspect of the disclosed subject matter, a recording medium with a program for causing a computer that controls a data communication device including a first communication means that receives encrypted data and a second communication means that transmits the encrypted data, to perform: when the first communication means has received information for encryption that is used for establishing encrypted communications including encrypted part and plaintext part where the plaintext part includes identification information of a transmission source of the encrypted data, acquiring the identification information from the information for encryption; and setting data transmission of the second communication means, based on the identification information.

Advantageous Effects of Invention

According to the disclosed subject matter, a data communication device can set data transmission without decrypting relaying data.

DESCRIPTION OF EMBODIMENTS

The following will describe example embodiments of the disclosed subject matter, without an intent to limit the disclosed subject matter according to the claims. Not all combinations of features described in the example embodiments are necessary as means for solving the disclosed subject matter.

Figure 1:
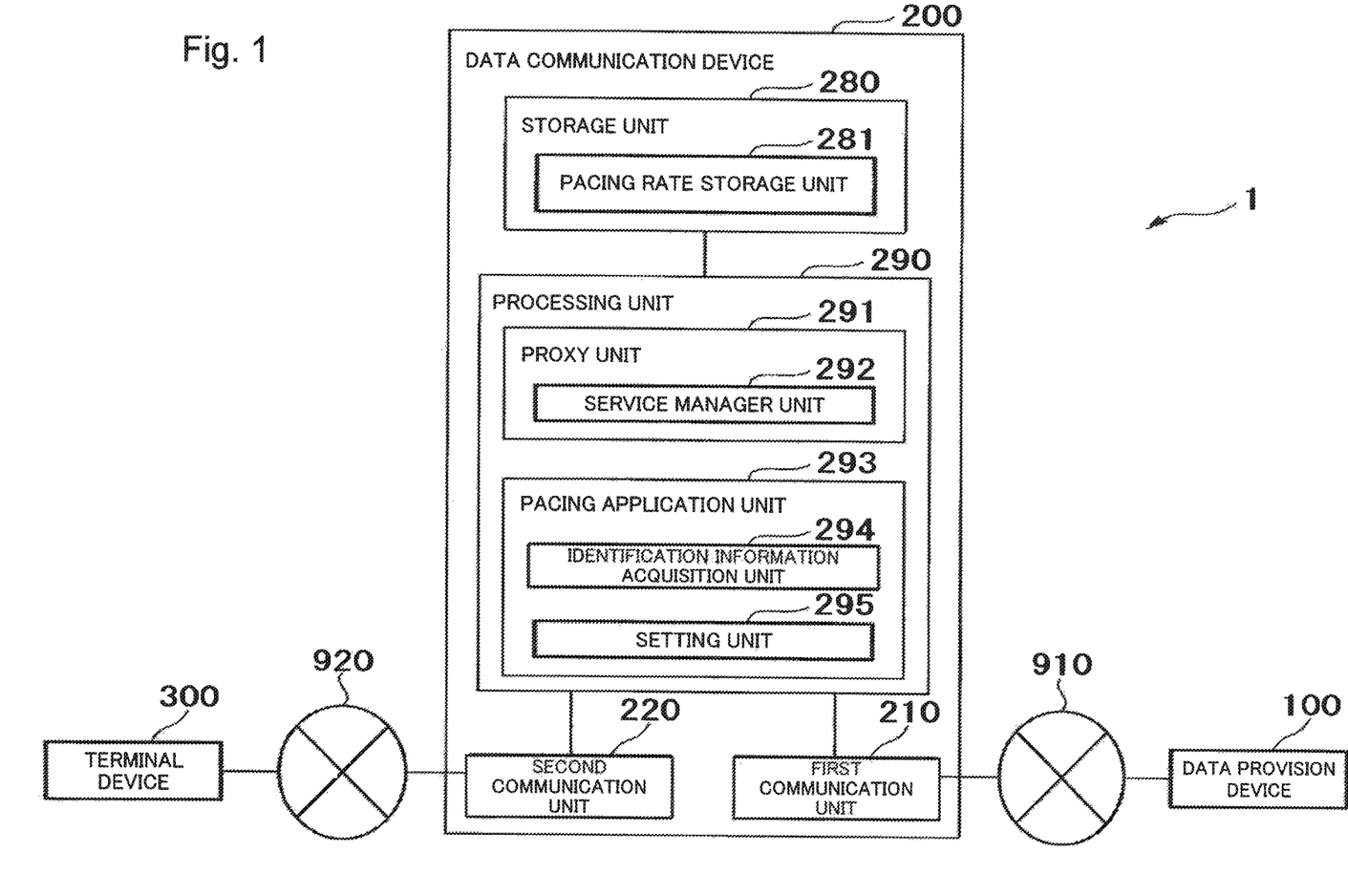
FIG. 1 is a schematic block view indicating functional components of a communication system according to an example embodiment of the disclosed subject matter.

FIG. 1 is a schematic block view indicating functional components of a communication system according to an example embodiment of the disclosed subject matter. As illustrated in FIG. 1, the communication system 1 comprises a data provision device 100, a data communication device 200, and a terminal device 300. The data communication device 200 comprises a first communication unit 210, a second communication unit 220, a storage unit 280, and a processing unit 290. The storage unit 280 comprises a pacing rate storage unit 281. The processing unit 290 comprises a proxy unit 291 and a pacing application unit 293. The proxy unit 291 comprises a service manager unit 292. The pacing application unit 293 comprises an identification information acquisition unit 294 and a setting unit 295. The data communication device 200 and the data provision device 100 communicate with each other via a server side network 910. The terminal device 300 and the data communication device 200 communicate with each other via a terminal side network 920.

The communication system 1 is a system that communicates encrypted data.

The following will describe an example of a case where the communication system 1 performs communications in secure sockets layer (SSL), without limiting the encryption method used by the communication system 1 to SSL. The encryption method used by the communication system 1 may be any method that establishes an encrypted communication by communicating information for encryption that includes encrypted part and plaintext part where the plaintext part includes identification information of a transmission source of encrypted data. A plaintext herein refers to a text that is not encrypted.

When the communication system 1 uses SSL, a server certificate corresponds to an example of information for encryption. In the server certificate, the common name indicating the scope of the server certificate (a host or the like that is certified) is written in plaintext. The common name is required to match the domain name of the server (FQDN; Fully Qualified Domain Name) in the specification of SSL. The domain name written as the common name corresponds to an example of the identification information of a transmission source that transmits encrypted data.

Further, the communication system 1 may also use transport layer security (TLS). In such a case, the server certificate corresponds to an example of information for encryption. Likewise, the domain name written as the common name corresponds to an example of the identification information of a transmission source that transmits encrypted data.

In the following description, data that are encrypted is referred to as encrypted data.

The terminal device 300 requests the data provision device 100 to transmit data and receives data that were transmitted in response to the request. Various devices can be used as a device constituting the terminal device 300. For example, the terminal device 300 may be any one of a smartphone, mobile telephone, tablet terminal device, personal computer, and a television receiver with a network connection feature.

The data provision device 100 is a server device that transmits requested data in response to a transmission request from the terminal device 300 and is constituted, for example, using a computer. The data provision device 100 encrypts the requested data using SSL and transmits the data.

The following explains, as an example, a case where the terminal device 300 requests the data provision device 100 to transmit data including a video and displays the video, based on received data. However, data of which transmission is requested by the terminal device 300 (data transmitted by the data provision device 100) is not limited to data including a video.

The data communication device 200 relays communications between the terminal device 300 and the data provision device 100. In particular, the data communication device 200 controls pacing of data transmitted from the data provision device 100 to the terminal device 300. The data communication device 200 is constituted, for example, using a computer.

The first communication unit 210 communicates with the data provision device 100 via the server side network 910. In particular, the first communication unit 210 receives encrypted data transmitted from the data provision device 100.

The first communication unit 210 further receives a server certificate of the data provision device 100 transmitted by the data provision device 100 in an SSL handshake upon initiation of an SSL session with the data provision device 100. This server certificate corresponds to an example of information for encryption used for establishing encrypted communications including encrypted part and plaintext part where the plaintext part includes identification information of a transmission source that transmits encrypted data.

The second communication unit 220 communicates with the terminal device 300 via the terminal side network 920. In particular, the second communication unit 220 transmits the encrypted data received by the first communication unit 210 to the terminal device 300.

The storage unit 280 is constituted using a storage device equipped in the data communication device 200 and stores various information. The storage unit 280 may be incorporated in the main body of the data communication device 200 or constituted as a separate device from the main body of the data communication device 200. For example, the storage unit 280 may be constituted including a hard disk device externally attached to the main body of the data communication device 200.

The pacing rate storage unit 281 stores pacing rate information indicating a pacing rate for each domain in advance (prior to the data communication device 200 starting relaying data from the data provision device 100 to the terminal device 300). In the pacing rate information, a domain name is associated with a pacing rate one on one.

The pacing rate herein refers to information indicating a packet transmission amount per unit time. In pacing control, a packet transmission rate (a packet communication amount per unit time) is controlled by intentionally providing an interval between a packet transmission and a subsequent packet transmission.

The pacing rate corresponds to an example of a video transmission rate.

The processing unit 290 executes a variety of processing by controlling the various units of the data communication device 200. The processing unit 290 is implemented as, for example, a central processing unit (CPU) provided in the data communication device 200, which reads out a program from the storage unit 280 and executes it.

The proxy unit 291 functions as a proxy server in communications between the terminal device 300 and the data provision device 100. Specifically, the proxy unit 291 functions as a server for the terminal device 300 and as a client for the data provision device 100.

The service manager unit 292 analyzes a request from the terminal device 300 and determines processing to be applied.

The pacing application unit 293 controls pacing of data. In particular, the pacing application unit 293 controls pacing of data that are communicated via SSL.

The identification information acquisition unit 294 acquires (reads out) a domain name that is written as a common name (FQDN) from a server certificate of the data provision device 100 that was received by the first communication unit 210. The domain name that the identification information acquisition unit 294 acquires corresponds to an example of identification information of a transmission source that transmits encrypted data.

The setting unit 295 sets data transmission of the second communication unit 220, based on the identification information acquired by the identification information acquisition unit 294. Specifically, the setting unit 295 sets a data transmission rate according to a video transmission method used by a transmission source indicated by the identification information.

The video transmission method (a delivery method) herein can be largely classified into progressive download and adaptive bitrate (ABR) streaming.

Progressive download is a method of reproducing a single video file while simultaneously downloading it. The bit rate is fixed for the same video in the progressive download method.

On the other hand, in ABR, a plurality of bit rates is prepared for a single video on the server side.

In addition, content segments are prepared for each video. Then, in ABR, an optimal bit rate is determined according to the communication conditions between a terminal device (particularly, a portable terminal device such as a smartphone) and the server device and content segments are transmitted and received at the determined bit rate. In ABR, a bit rate can be changed in the middle of streaming according to a change in the communication conditions.

In general, the transmission method to be used is defined for each domain.

As such, the setting unit 295 determines a pacing rate, based on the domain name acquired by the identification information acquisition unit 294. Specifically, the setting unit 295 refers to the pacing rate information stored in the pacing rate storage unit 281 and reads out a pacing rate that is associated with the domain acquired by the identification information acquisition unit 294. The setting unit 295 determines the pacing rate read out from the pacing rate information as the pacing rate with which the pacing application unit 293 controls pacing of transmission data.

With progressive download, when a pacing rate is set excessively low (i.e., a packet transmission interval is set long), the transmission bit rate may be lower than the bit rate of the content, whereby viewing of the video on the terminal device 300 is interrupted. For this reason, the pacing rate cannot be set too low in progressive download.

Whereas, with ABR, when a pacing rate is set low, the terminal device 300 requires contents of a low bit rate. In this way, interruption of video viewing on the terminal device 300 can be avoided as the terminal device 300 requests low bit rate contents. Thus, a lower pacing rate can be set with ABR than in the case of progressive download.

Accordingly, in the pacing rate information that is stored in the pacing rate storage unit 281, a pacing rate for a domain that uses progressive download is set in advance higher than a predetermined pacing rate (i.e., a packet transmission interval is set shorter). In addition, a pacing rate for a domain using ABR is set lower than a predetermined pacing rate (i.e., a packet transmission interval is set longer).

In this way, the communication traffic can be reduced while lowering the risk of interrupting video viewing on the terminal device 300.

The server side network 910 is a communication network that mediates communications between the data provision device 100 and the data communication device 200. The terminal side network 920 is a communication network that mediates communications between the data communication device 200 and the terminal device 300. For example, the server side network 910 may be the Internet and the terminal side network 920 may be a mobile telephone network (a cellular network, i.e., a wireless communication network provided by a telecommunication career for mobile communication terminal devices such as smartphones and mobile telephones) without limitation. Both server side network 910 and terminal side network 920 may be a wired communication network or a wireless communication network. Alternatively, both server side network 910 and terminal side network 920 may be different parts of the same communication network, such as parts of the Internet.

Note that the communication system 1 may comprise a plurality of terminal devices 300. Further, the communication system 1 may comprise a plurality of data provision devices 100. The communication system 1 may comprise a plurality of terminal devices 300 and a plurality of data provision devices 100. The data communication device 200 relays communications between the terminal device 300 and the data provision device 100 for each data transmission request from the terminal device 300.

Next, with reference to FIG. 2, the operation of the communication system 1 will be described.

Figure 2:
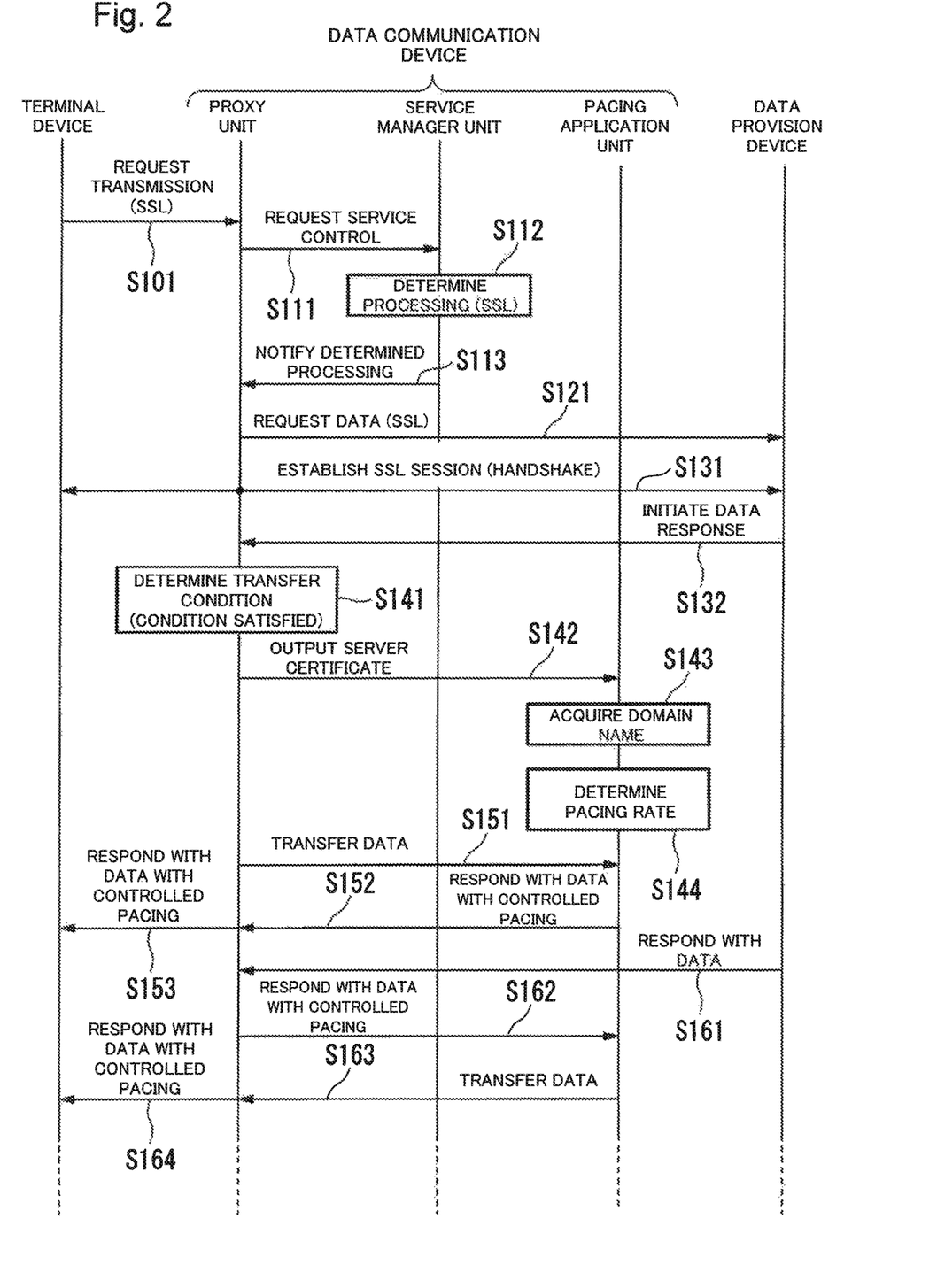
FIG. 2 is an explanatory view indicating an example of a procedure of processing performed by a communication system 1 when a terminal device 300 requests transmission of data including a video and a data provision device 100 transmits requested data.

FIG. 2 is an explanatory view illustrating an example of a procedure of processing performed by the communication system 1 when the terminal device 300 requests transmission of data including a video and the data provision device 100 transmits requested data.

In the processing illustrated in FIG. 2, the terminal device 300 transmits a data transmission request in SSL to the data communication device 200 (sequence S101). Although the data provision device 100 is the one that actually transmits data, the data communication device 200 acts as a proxy server for the terminal device 300. Thus, the terminal device 300 transmits the data transmission request to the data communication device 200.

In the data communication device 200 that received the data transmission request from the terminal device 300, the proxy unit 291 requests control of processing for the terminal device 300 (sequence S111). Specifically, the data transmission request transmitted from the terminal device 300 is received by the second communication unit 220 that then outputs the request to the proxy unit 291. The proxy unit 291 calls a service manager unit 292 and causes it to control processing for providing a service in response to the data transmission request from the terminal device 300.

The service manager unit 292 that received an instruction from the proxy unit 291 analyzes the data transmission request and determines processing for the terminal device 300 (sequence S112). In the example of FIG. 2, the service manager unit 292 determines the use of SSL communications.

Then, the service manager unit 292 notifies the proxy unit 291 of the processing determined at sequence S112 (sequence S113). In the example of FIG. 2, the service manager unit 292 notifies the proxy unit 291 of the use of SSL communications.

The proxy unit 291 that received a notification from the service manager unit 292, transmits the data transmission request that was received from the terminal device 300 at sequence S101 to the data provision device 100 via the first communication unit 210 (sequence S121).

Subsequent to this data transmission request, the terminal device 300 performs a handshake for establishing an SLL session with the data provision device 100 via the data communication device (the proxy unit 291) (sequence S131). Although a handshake is illustrated in FIG. 2 as a single signal transmission from the data provision device to the terminal device, a plurality of signal transmissions and receptions may be performed between the terminal device and the data provision device.

When the SSL session has been established at sequence S131, the data provision device 100 starts transmitting the requested data (sequence S132). The data provision device 100 transmits the data including a video via the SSL session established at sequence S131. Then, the data communication device 200 receives the video data (the data including a video).

In the data communication device 200 that received the video data, the proxy unit 291 determines whether the SSL transfer conditions are satisfied (S141). For example, the proxy unit 291 determines whether data can be transmitted to the terminal device 300, such as whether a session with the terminal device 300 has been established.

In the example of FIG. 2, the data communication device 200 determines that the SSL transfer conditions are satisfied.

Next, the proxy unit 291 that determined that the SSL transfer conditions were satisfied, outputs the server certificate of the data provision device 100 acquired at sequence S132 to the pacing application unit 293 (sequence S142).

In the pacing application unit 293, the identification information acquisition unit 294 acquires the domain name (FQDN) of the data provision device 100 from the server certificate (sequence S143).

Then, the setting unit 295 determines a pacing rate for data transmission to the terminal device 300, based on the domain name acquired by the identification information acquisition unit 294 (sequence S144).

Specifically, the setting unit 295 refers to the pacing rate information stored in the pacing rate storage unit 281, reads out a pacing rate that is associated with the domain acquired by the identification information acquisition unit 294, and determines the read out set rate as the pacing rate.

The proxy unit 291 transfers the data transmitted by the data provision device 100 at sequence S132 to the pacing application unit 293 (sequence S151).

The pacing application unit 293 controls the pacing of the data transferred from the proxy unit 291 at the pacing rate determined at sequence S144 and outputs the data to the proxy unit 291 (sequence S152). Then, the proxy unit 291 transmits the data output by the pacing application unit 293 to the terminal device 300 via the second communication unit 220 (sequence S153). In this way, the proxy unit 291 transmits the data output by the pacing application unit 293 to the terminal device 300 via the proxy unit 291 and the second communication unit 220.

Further, the data provision device 100 transmits the requested data to the data communication device 200 (sequence S161). The data provision device 100 transmits the data including a video via the SSL session established at sequence S131. Then, the data communication device 200 receives the video data.

The proxy unit 291 transfers the data transmitted by the data provision device 100 at sequence S161 to the pacing application unit 293 (sequence S162).

The pacing application unit 293 controls the pacing of the data transferred from the proxy unit 291 at the pacing rate determined at sequence S144 and outputs the data to the proxy unit 291 (sequence S163). Then, the proxy unit 291 transmits the data output by the pacing application unit 293 to the terminal device 300 via the second communication unit 220 (sequence S164). In this way, the proxy unit 291 transmits the data output by the pacing application unit 293 to the terminal device 300 via the proxy unit 291 and the second communication unit 220.

Thereafter, processing at sequences S161 to S164 are repeated until completion of the video transmission.

As described above, when the first communication unit 210 has received the server certificate of the data provision device 100, the identification information acquisition unit 294 acquires the domain name of the data provision device 100 from the server certificate. Then, the setting unit 295 sets data transmission of the second communication unit 220, based on the domain name acquired by the identification information acquisition unit 294.

In this way, the setting unit 295 can set data transmission without decrypting data from the data provision device 100. Since decryption of data is not performed, the setting unit 295 can set data transmission faster and the load of the setting unit 295 can be reduced.

Further, the first communication unit 210 receives encrypted data including video data from the data provision device 100. Then, the setting unit 295 sets a data transmission rate according to the video transmission method used by the transmission source indicated by the domain name of the data provision device 100.

With the data communication device 200, the data transmission rate can be set according to the video transmission method for the domain of the data transmission source. In this way, the communication traffic can be reduced while lowering the risk of interrupting video viewing on the terminal device 300.

By pacing a video to control a transmission rate (pacing rate) in accordance with the bit rate of the video, unnecessary communication traffics that occur during suspension of reproducing the video can be reduced. In pacing a video, the bit rate of the video may be acquired by referring to information at the application layer (Layer 7) such as hypertext transfer protocol (HTTP).

However, the application layer (Layer 7) is encrypted in SSL. As such, when decryption is not performed at the data communication device that relays data transmission, the bit rate of a video cannot be acquired from the application layer.

In the data communication device 200, therefore, the identification information acquisition unit 294 acquires the domain name of the data provision device 100 from the server certificate of the data provision device 100. Then, the setting unit 295 determines a pacing rate, based on the domain name acquired by the identification information acquisition unit 294. Specifically, the setting unit 295 refers to the pacing rate information stored in the pacing rate storage unit 281 and reads out a pacing rate that is associated with the domain name of the data provision device 100. Then, the setting unit 295 determines the read-out pacing rate as the pacing rate with which the pacing application unit 293 controls pacing of transmission data.

In this way, the pacing application unit 293 can control pacing at the pacing rate corresponding to the domain.

In particular, as described above, the pacing rate of a domain that uses progressive download is set in advance higher than a predetermined pacing rate in the pacing rate information stored in the pacing rate storage unit 281. Whereas, the pacing rate of a domain using ABR is set lower than a predetermined pacing rate. According to this pacing rate information, for a domain that uses ABR as a video transmission method, the pacing application unit 293 controls pacing at a pacing rate that is lower than a predetermined pacing rate. Whereas, for a domain that uses progressive download as a video transmission method, the pacing application unit 293 controls pacing at a pacing rate that is higher than a predetermined pacing rate. In this way, the data communication device 200 enables both maintaining video viewability for users and reducing use of bandwidth. In other words, the communication traffic can be reduced while lowering the risk of interrupting video viewing on the terminal device 300.

Note that the method by which the setting unit 295 acquires a pacing rate corresponding to a domain name is not limited to the method of referring to the pacing rate information stored in the pacing rate storage unit 281 in advance. For example, the communication system 1 may be provided with a management device that manages a pacing rate for each domain separately from the data communication device 200. This management device may acquire information of a video transmission method used by a domain by communicating with the domain and store the domain name and the transmission method in association with each other. Then, the setting unit 295 may inquire the transmission method by transmitting the domain name acquired by the identification information acquisition unit 294 to the management device and set the pacing rate according to the transmission method that is answered by the management device.

Note that data of which transmission is requested by the terminal device 300 (data transmitted by the data provision device 100) is not limited to data including a video.

For example, the data communication device 200 may set quality of service (QoS) according to a transmission source that transmits communication data. In such a case, the data of which transmission is requested by the terminal device 300 may be an arbitrary kind of data without limitation to data including a video.

As described above, the communication system 1 is applicable to a variety of communication networks. For example, the communication system 1 may be used for controlling communication traffic in SSL communications between a mobile communication terminal device and a video delivery service device in a mobile telephone network. Alternatively, the communication system 1 may be used for controlling communication traffic in SSL communications through a variety of communication networks, such as a wireless local area network (LAN), a wired LAN, and an optical fiber network, without limitation to the mobile telephone network.

As described above, the scope of the communication system 1 is not limited to communication traffic control. For example, the communication system 1 may be used for QoS control.

Next, with reference to FIGS. 3 and 4, minimum components of the disclosed subject matter will be described.

Figure 3:
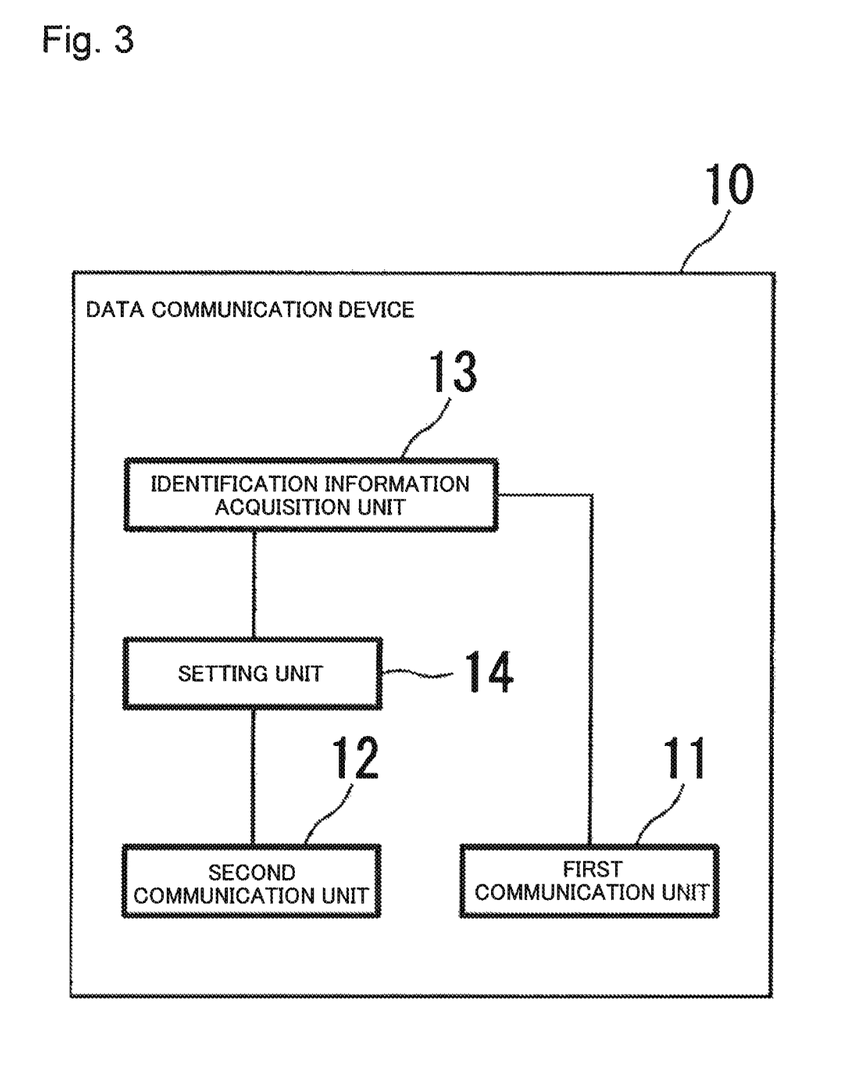
FIG. 3 is a schematic block view indicating minimum components of a data communication device according to the disclosed subject matter.

FIG. 3 is a schematic block view indicating minimum components of a data communication device according to the disclosed subject matter. The data communication device 10 illustrated in FIG. 3 comprises a first communication unit 11, a second communication unit 12, an identification information acquisition unit 13, and a setting unit 14.

With such components, the first communication unit 11 receives encrypted data.

The second communication unit 12 transmits the encrypted data received by the first communication unit 11.

When the first communication unit 11 has received a server certificate, the identification information acquisition unit 13 acquires the domain name from the server certificate. The server certificate corresponds to an example of information for encryption used for establishing encrypted communications including encrypted part and plaintext part where the plaintext part includes identification information of a transmission source that transmits encrypted data. The domain name corresponds to an example of identification information of a transmission source that transmits encrypted data.

Then, the setting unit 14 sets data transmission of the second communication unit 12, based on the domain name acquired by the identification information acquisition unit 13.

In this way, the setting unit 14 can set data transmission of the second communication unit 12 without decrypting the data received by the first communication unit 11. Since decryption of data is not performed, the setting unit 14 can set data transmission faster and the load of the setting unit 14 can be reduced.

Figure 4:
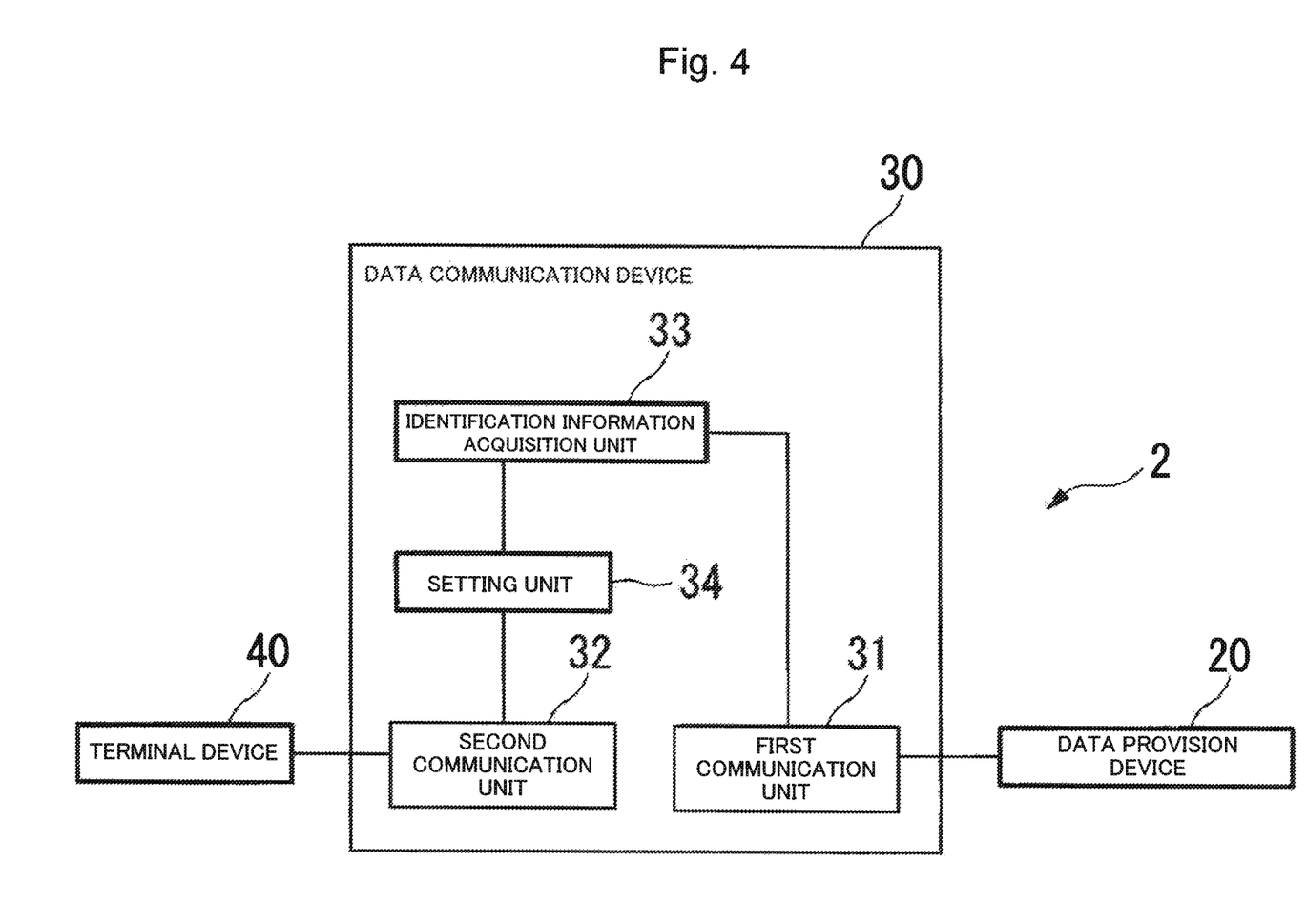
FIG. 4 is a schematic block view indicating minimum components of a communication system according to the disclosed subject matter.

FIG. 4 is a schematic block view indicating minimum components of a communication system according to the disclosed subject matter. The communication system 2 illustrated in FIG. 4 comprises a data provision device 20, a data communication device 30, and a terminal device 40. The data communication device 30 comprises a first communication unit 31, a second communication unit 32, an identification information acquisition unit 33, and a setting unit 34.

With such components, the terminal device 40 requests data transmission. The data provision device 20 transmits encrypted data in response to a request from the terminal device 40. The data communication device 30 relays communications between the data provision device 20 and the terminal device 40.

Then, the first communication unit 31 receives the encrypted data that were transmitted from the data provision device 20.

The second communication unit 32 transmits the encrypted data received by the first communication unit 31 to the terminal device 40.

When the first communication unit 31 has received a server certificate, the identification information acquisition unit 33 acquires the domain name of the data provision device 20 from the server certificate. This server certificate corresponds to an example of information for encryption used for establishing encrypted communications including encrypted part and plaintext part where the plaintext part includes identification information of the data provision device 20. Likewise, the domain name of the data provision device 20 corresponds to an example of the identification information of the data provision device 20.

Then, the setting unit 34 sets data transmission of the second communication unit 32, based on the domain name acquired by the identification information acquisition unit 33.

In this way, the setting unit 34 can set data transmission of the second communication unit 32 without decrypting data received by the first communication unit 31. Since decryption of data is not performed, the setting unit 34 can set data transmission faster and the load of the setting unit 34 can be reduced.

Note that a program for realizing the functions of all or part of the processing unit 290, identification information acquisition unit 13, setting unit 14, identification information acquisition unit 33, and setting unit 34 may be recorded in a computer-readable recording medium, and processing of each unit may be performed when a computer system reads and executes the program recorded in the recording medium. Note that the "computer system" herein includes an operating system (OS) and hardware such as peripheral devices.

Further, the "computer-readable recording medium" refers to a portable medium, such as a flexible disk, magneto-optical disk, read only memory (ROM), compact disc read only memory (CD-ROM), and a storage device such as a hard disk embedded in a computer system. Further, the above-described program may realize part of the above-described functions or may realize the functions in combination with another program that has been already stored in the computer system.

Although the example embodiments of the disclosed subject matter have been described in detail with reference to the drawings, components in implementation include not only those in the example embodiments but also those in any example embodiments within the scope not departing from the subject matter of the invention.

This application is based upon and claims the benefit of priority from Japanese Patent Application No. 2015-238426, filed on Dec. 7, 2015, the disclosure of which is incorporated herein in its entirety by disclosure.

REFERENCE SIGNS LIST 1, 2 COMMUNICATION SYSTEM
10, 30, 200 DATA COMMUNICATION DEVICE
11, 31, 210 FIRST COMMUNICATION UNIT
12, 32, 220 SECOND COMMUNICATION UNIT
13, 33, 294 IDENTIFICATION INFORMATION ACQUISITION UNIT
14, 34, 295 SETTING UNIT
20, 100 DATA PROVISION DEVICE
40, 300 TERMINAL DEVICE
280 STORAGE UNIT
281 PACING RATE STORAGE UNIT
290 PROCESSING UNIT
291 PROXY UNIT
292 SERVICE MANAGER UNIT
293 PACING APPLICATION UNIT
910 SERVER SIDE NETWORK
920 TERMINAL SIDE NETWORK

What is claimed is:

1. A data communication device comprising:
a first communicator configured to receive encrypted data;
a second communicator configured to transmit the encrypted data;
an identification information acquisition unit configured to, when the first communicator has received information for encryption that is used for establishing encrypted communications including an encrypted part and a plaintext part where the plaintext part includes identification information of a transmission source of the encrypted data, acquire the identification information from the information for encryption; and
a configurator configured to set data transmission of the second communicator, based on the identification information,
wherein the configurator is further configured to determine a pacing rate for controlling paging of transmitted data,
wherein the configurator is further configured to set the pacing rate of a domain for progressive download to a relatively high level where interval of packet transmission is relatively short in a pacing rate information,
wherein the configurator is further configured to set the pacing rate of a domain for adaptive bitrate (ABR) to a relatively low level where the interval of packet transmission is relatively long in the pacing rate information,
wherein the identification information acquisition unit is further configured to acquire the domain name of the data provision device from the server certificate of the data provision device, and
wherein the configurator is further configured to set the pacing rate based on the domain name acquired by the identification information acquisition unit.

2. The data communication device according to claim 1, wherein the first communicator is further configured to receive the encrypted data including video data; and
wherein the configurator is further configured to set a data transmission rate according to a video transmission method used by the transmission source indicated by the identification information.

3. A communication system comprising:
a terminal device configured to request data transmission;
a data provision device configured to transmit encrypted data in response to a request from the terminal device; and a data communication device configured to relay communications between the data provision device and the terminal device, the data communication device comprising:
  a first communicator configured to receive the encrypted data that was transmitted from the data provision device;
  a second communicator configured to transmit the encrypted data to the terminal device;
  an identification information acquisition unit configured to, when the first communicator has received information for encryption that is used for establishing encrypted communications including encrypted part and plaintext part where the plaintext part includes identification information of the data provision device, acquire the identification information from the information for encryption; and
  a configurator configured to set data transmission of the second communicator, based on the identification information,
wherein the configurator is further configured to determine a pacing rate for controlling paging of transmitted data,
wherein the configurator is further configured to set the pacing rate of a domain for progressive download to a relatively high level where interval of packet transmission is relatively short in a pacing rate information,
wherein the configurator is further configured to set the pacing rate of a domain for adaptive bitrate (ABR) to a relatively low level where the interval of packet transmission is relatively long in the pacing rate information,
wherein the identification information acquisition unit is further configured to acquire the domain name of the data provision device from the server certificate of the data provision device, and
wherein the configurator is further configured to determine a pacing rate based on the domain name acquired by the identification information acquisition unit.

4. A data relay method comprising:
by the data communication device that comprises a first communicator that receives encrypted data and a second communicator that transmits the encrypted data, when the first communicator has received information for encryption that is used for establishing encrypted communications including encrypted part and plaintext part where the plaintext part includes identification information of a transmission source of the encrypted data, acquiring the identification information from the information for encryption;
by the data communication device, setting data transmission of the second communicator, based on the identification information;
by the data communication device, determining a pacing rate for controlling paging of transmitted data is determined;
by the data communication device, setting the pacing rate of a domain for progressive download to a relatively high level where interval of packet transmission is relatively short in a pacing rate information;
by the data communication device, setting the pacing rate of a domain for adaptive bitrate (ABR) to a relatively low level where the interval of packet transmission is relatively long in the pacing rate information;
by the data communication device, acquiring the domain name of the data provision device from the server certificate of the data provision device; and
by the data communication device, determining a pacing rate based on the domain name acquired by the identification information acquisition unit.

* * * * *